United States Patent [19]
Detroit

[11] Patent Number: 5,925,743
[45] Date of Patent: Jul. 20, 1999

[54] POLYMERIZED ALKALINE LIGNIN MATERIALS

[75] Inventor: William J. Detroit, Schofield, Wis.

[73] Assignee: Lignotech USA, Inc., Rothschild, Wis.

[21] Appl. No.: 09/010,450

[22] Filed: Jan. 21, 1998

[51] Int. Cl.⁶ .............................. C07G 1/00; C08L 97/00
[52] U.S. Cl. ............................................ 530/500; 530/501
[58] Field of Search ..................................... 530/500, 501

[56] References Cited

U.S. PATENT DOCUMENTS 4,773,966  9/1988  Huynh ........................................ 162/78

*Primary Examiner*—Nathan M. Nutter
*Attorney, Agent, or Firm*—Andrus, Sceales, Starke & Sawall

[57] ABSTRACT

A method for preparing a polymerized alkali lignin material which comprises reacting an alkaline solution of alkali lignin obtained from an alkaline pulping process at a temperature between about 20° C. to 90° C. with between 5% to 80% by weight based on said alkali lignin of sodium persulfate at a pH of between about 7 to 12 for a sufficient time to form a polymerized alkali lignin. Optionally, the alkaline solution of alkali lignin may be oxidized for a period time sufficient to activate the alkali lignin prior to reacting the solution with sodium persulfate.

29 Claims, No Drawings

POLYMERIZED ALKALINE LIGNIN MATERIALS

CROSS-REFERENCE TO RELATED APPLICATIONS

STATEMENT REGARDING FEDERALLY SPONSORED RESEARCH OR DEVELOPMENT

BACKGROUND OF THE INVENTION

This invention relates to water soluble polymerized lignin derivatives formed by free radical initiation reaction of sodium persulfate on lignin and/or modified (so as to be activated or conditioned) lignin obtained from alkaline pulping liquors. The polymerized lignin derivatives without activation are of particular utility as surface active agents for dispersants, emulsion stabilizers, flocculation, flotation, etc. Polymerized lignin derivatives formed after activation are of particular utility in flocculation applications and where thixotropic or gelation properties are required such as in low solids drilling fluids, dust prevention and the like.

Other lignins and lignin-like material such as lignosulfonates, peat, lignite and sulfonated, desulfonated lignosulfonates do not polymerize with sodium persulfate in the same manner as alkali lignin.

Lignin suitable for use in this invention is obtained as a byproduct of the pulping of wood by alkaline pulping processes and is recovered from the spent pulping liquor separated from the cellulose pulp fibers which are the primary product of the pulping process. The lignin containing liquor obtained from alkaline pulping processes is acidified and the lignin, being insoluble in an acidic medium, is precipitated and separated by filtration from the water soluble salts which remain in the filtrate. Although the precipitated lignin is soluble in an alkaline aqueous medium, it is not of particularly high molecular weight nor is it particularly useful in a thixotropic or gelling system.

Other available polymers such as xanthan gum, polyacrylamides, polyacrylates, polyvinyl chlorides and the like are in some cases thixotropic polymer systems, but alternately lack salt tolerance, temperature stability, resistance to biochemical and biological degradation, cost/performance practicality, etc. It has now been found that polymerized lignin with and without thixotropic or gelation properties, depending on the end use properties required, can be prepared from alkaline pulping liquors with a cost/performance advantage and without the performance disadvantages listed above.

BRIEF SUMMARY OF THE INVENTION

The process of this invention, in the preferred embodiment thereof, involves as a first step, the isolation of alkali soluble lignin from spent liquor obtained from the pulping of wood chips by any of the common soluble base alkaline cooking processes, including the kraft or sulfate process, the soda process, the alkaline vapor phase cooling process and the like. The lignin isolation is commonly carried out in a conventional manner by acidifying the spent alkaline cooking liquor from the pulping process by addition of mineral acid or with flue gas to a pH of about 5. The lignin, being insoluble in acidic solution, precipitates and is isolated by conventional filtering and washing procedures. The resulting precipitated lignin serves as a starting material for the process of this invention.

To carry out the reaction with persulfate but without ozone oxidation activation, the washed lignin is redissolved in alkaline aqueous medium and the sodium persulfate in water solution is added at 10% to 60% based on alkaline lignin. The polymerized lignin is then formed by heating this reaction mixture with addition temperatures in the range of 30° C. to 80° C. being utilized. The properties of the end product are dependent on temperature maintained on the system during the reaction period, the concentration of lignin, the pH of the system, the amount of sodium persulfate added and on the particular source (that is the type of wood utilized in the pulping process) of lignin employed, as will be discussed in detail hereinafter.

To carry out the reaction with persulfate and with ozone oxidation activation, the washed lignin referred to above is dissolved in alkaline aqueous medium with excess alkaline component of 2% to 10% based on lignin used. Ozone reaction is carried out as taught in U.S. Pat. No. 3,726,850, the disclosure of which is specifically incorporated herein by reference, by passing ozone enriched oxygen or air through the solution until an ozone absorption approximating 2% to 15% based on weight of lignin is achieved. This solution containing the activated or conditioned ozone oxidized lignin is used as the raw material for the polymerization reaction with sodium persulfate as described previously with sodium persulfate treatment of 20% to 80% based on ozone oxidized lignin.

The products may also be sulfoalkylated, e.g. sulfomethylated and/or oxidized with air, ozone, hydrogen peroxide or combinations thereof. The degree of polymerization, as well as the degree of sulfomethylation or oxidation results in developing a series of products of varying molecular weights resulting in the ability to tailor-make end products for specific applications.

It is an object of this invention to show a method of selectively and exclusively polymerizing alkaline lignin by free radical initiation with sodium persulfate.

It is a further object of this invention to readily obtain a controlled series of polymerized alkaline lignin products.

It is a further object of this invention to show that additional reactions of sulfoalkylation and/or oxidation on the polymerized alkaline lignin derivatives produce a series of surface active agents of varying molecular weight for dispersants, emulsion stabilizers, etc.

It is a further object of this invention to show that ozone oxidation exclusively before polymerization with sodium persulfate produces a polymeric system of very high molecular weight, said system being of a thixotropic-gelation character particularly useful in low solids drilling fluids.

It is a further objection of this invention to show that ozone activated alkaline lignin containing a very small amount of strengthened biopolymer (xanthan) will give particularly useful thixotropic systems when reacted to polymerize using free radical initiation with sodium persulfate.

DETAILED DESCRIPTION OF THE INVENTION

Raw Material:

As previously stated, the raw material for carrying out the present invention is lignin obtained from spent alkaline liquor which results from the pulping of wood or similar fibrous vegetable matter by any of the common soluble base alkaline pulping processes. Although lignin from the pulping of any of the common pulp producing sources has been generally satisfactory for the purpose of this invention, lignin from the pulping of wood chips is preferred, the highest quality products being prepared by the process of this invention from lignin resulting from the alkaline pulping of softwood wood chips.

It has been previously indicated herein that the lignin is preferably separated from the remaining alkaline pulping liquor constituents prior to carrying out the process of this invention. The process may alternatively be carried out on the whole spent liquor, however, with results which are only slightly less satisfactory than when separated lignin is used, if allowance is made in the evaluation of the effectiveness of the resulting dispersant material, for the substantial amount of non-contributory material present in the product.

Sodium Persulfate Polymerization:

Alkaline lignin without ozone activation can be selectively and exclusively polymerized by free radical initiation with sodium persulfate as shown in Example 1.

Ozone Activation Reaction:

Ozone oxidation activation as described below allows polymerization with a higher dosage of persulfate, from 30% to 100%, based on weight of ozone oxidized lignin. This polymerization can result in an advantageous thixotropic or gelation system as described in Example 3.

Ozone oxidation of alkali lignin at the rate of 2% to 15% ozone based on alkaline lignin carried out as describe in U.S. Pat. No. 3,726,850 activates or conditions the alkaline lignin to more productive free radical polymerization using sodium persulfate. Without being limited in theory, the ozone oxidation opens ring structures allowing more sites for effective free radical formation with sodium persulfate. This activation allows free radical polymerization to very high values as hereinafter described.

Alkalinity of Reaction Mixture:

Persulfate free radical polymerization can be carried out in acid or alkaline pH ranges. Preferred pH range is 5 to 9.5.

Temperature of Reaction:

Persulfate free radical polymerization can be carried at temperatures of 0° C. to 90° C. Preferred temperatures are between 30° C. and 50° C.

Concentration of Reactants:

Dependent on thickening to be expected, activated (ozone oxidized) polymerization at sodium persulfate charge higher than about 35% are necessarily diluted to lower solids concentration to prevent complete gel formation.

The following specific examples of the process of this invention and of the properties of the products obtained thereby will serve to exemplify the advantages of the invention providing a controlled selective polymerization of alkaline kraft lignin for a varying molecular size series of surface active agents for dye dispersants, emulsion stabilizers, flocculants, fluid loss control, film forming (dedusting), oil well low solids drilling systems, etc.

EXAMPLE 1

Polymerized Non-Activated Alkali Lignin

Alkali lignin without ozone activation can be selectively and exclusively polymerized by free radical initiation with sodium persulfate as shown in the following table.

TABLE 1

| Notebook Reference | Product | % Sodium Persulfate | Relative Molecular Size (HPLC) | % Size Increase |
|---|---|---|---|---|
| 284-20 | Curan 27-11 Kraft Lignin | 0 | 20,000 | — |
| 284-20 | Curan 27-11 Kraft Lignin | 5 | 60,000 | 200 |
| 284-20 | Curan 27-11 Kraft Lignin | 10 | 90,000 | 350 |
| 284-20 | Curan 27-11 Kraft Lignin | 20 | 100,000 (some precipitate) | 400 |
| 284-27 | Peat (causticized) | 0 | 9,898 | — |
| 284-29 | Peat (causticized) | 10 | 9,753 | 0 |
| 284-33A | Lignite (causticized) | 0 | 22,148 | — |
| 284-33B | Lignite (causticized) | 20 | 22,878 | 0 |
| 284-24 | SFX-65 LSO$_3$ 08C-31 | 0 | 54,193 | — |
| 284-24 | SFX-65 | 20 | 54,094 | 0 |
| 284-34 | Vanisperse CB (R-326-3) | 0 | 7,830 | — |
| 284-34 | Vanisperse CB | 20 | 10,490 | 33 |

Treatment of alkaline kraft lignin with successive dosages of sodium persulfate at 5%, 10% and 20% incrementally increases the molecular weight from 20,000 to 100,000 as measured by High Pressure Liquid Chromatography (HPLC) as shown by samples 284-20. The HPLC determination are carried out as described in Molecular Weight Determination by HPLC, LignoTech USA Method RAM-010 Sept. 1, 1995.

None of the other lignin-like or lignosulfonate materials responded as well to the catalytic free radical polymerization capability of sodium persulfate. Lignosulfonate (SFX-65-LignoTech), lignite and peat had essentially 0% molecular size increase. Vanisperse CB, a LignoTech desulfonated lignosulfonate recovered from the Vanillin process as taught in U.S. Pat. No. 2,491,832, had a modest response with 33% molecular size increase at the high doses of 20% sodium persulfate. This compares to the over 400% molecular size increase of kraft lignin at 20% sodium persulfate treatment. This unique response of kraft lignin is the basis for a regulated production of kraft lignin products of varying molecular weights.

EXAMPLE 2

Polymerization—Sulfoalkylation

Alkaline lignin (Curan 27-11) was polymerized by free radical initiation with sodium persulfate at two dosages (5% and 10%) as described in Example 1 and then the raw material and both polymerized samples were sulfomethylated at the same treatment of formaldehyde and sodium bisulfite equivalent. Molecular size of the raw material and polymerized samples as well as molecular weights and sulfur analysis of the sulfomethylated materials are shown in Table 2.

TABLE 2

POLYMERIZATION, SULFOMETHYLATION - CURAN 27-11

| | | Reaction Conditions | | | Product | | | | | | |
|---|---|---|---|---|---|---|---|---|---|---|---|
| | | Polymeri-zation | Sulfomethylation | | Molecular Size* | % Size Increase | | Sulfur Analysis | | | |
| Notebook Reference | Product Description | % $Na_2S_2O_3$ | % HCHO | % $NaHSO_3$ Eq | HPLC Value | Over 27-11 | Over Sulf. 27-11 | Total S, % | Non-Sulfonic S, % | Sulfonic S, % | As is pH |
| 284-40A | Kraft Curan 27-11 Raw Material 01D-19 | 0 | 0 | 0 | 26,092 | — | — | — | — | — | 9.5 |
| 284-39A | Curan 27-11 5% Polymerization | 5 | 0 | 0 | 52,676 | 101.9% | — | — | — | — | 9.2 |
| 284-41A | Curan 27-11 10% Polymerization | 10 | 0 | 0 | 27,487 | 200.8% | — | — | — | — | 8.3 |
| 284-40A | Curan 27-11 Sulfomethylated | 0 | 8 | 20 | 40,747 | 56.2% | — | 5.34 | 0.82 | 4.52 | 8.7 |
| 284-39B | Curan 27-11 5% Polymerization Sulfomethylated | 5 | 8 | 20 | 93,324 | 257.7% | 129.0% | 6.30 | 2.02 | 4.28 | 8.1 |
| 284-41B | Curan 27-11 10% Polymerization Sulfomethylated | 10 | 8 | 20 | 201,579 | 672.6% | 394.7% | 7.15 | 3.40 | 3.75 | 7.5 |

Evaluations indicate that sulfomethylation of kraft lignin alone increases molecular size by 56%. Free radical polymerization alone increases size up to 200% and polymerization followed by sulfoalkylation increases molecular size up to 672.6% over the original raw material (alkaline lignin Curan 27-11). The sulfonic sulfur drops from 4.52% on the sulfomethylated raw material to 4.28% of the 5% polymerized sulfomethylated product to 3.75% sulfonic sulfur on 10% polymerized sulfoalkylated product. Polymerization would seem to obstruct sulfomethylation positions on the ring by those positions being part of the polymerization or by sterric hindrance during sulfomethylation. It is evident from the data in Table 2 that polymerization can be regulated by the charge of sodium persulfate added to the alkali lignin. A reproducible series of varying molecular weights can be cost effectively produced. Sulfoalkylation and/or oxidation of the polymerized products results in a uniform series of surface active agents of varying molecular size.

In summary, the invention disclosed herein for polymerization of non-activated alkali lignin is in actuality a regulated selective series of alkali lignin products of varying molecular size. The products could include sulfoalkylated and/or oxidized with air, ozone, hydrogen peroxide, or combinations thereof. All these processes result in a series of kraft lignin surface active agents of varying molecular size.

The sulfoalkylated or oxidized polymerized products obtained by the present practice are all found to be extremely useful and effective as improved dispersing agents for dyestuffs, clays, etc. The following dispersion evaluation was made in ASP-200 Stellar Clay according to the well-known standard ASP-200 Stellar Clay test using for the measurement a Fann Rotational Viscometer obtained from the Fann Instrument Company of Houston, Tex. (now Baroid, Inc.). Values for Yield Point, Fann 600°, 300°, 3° were obtained. The data obtained, of course, for Yield Point represent a force required to move a stationary clay system through plug flow to plastic flow condition in a pipe with the numerical measurement of Yield Point taken in lbs./100 ft.$^2$ of pipe surface; lower readings indicating better dispersant effect by additive as the consequences of requiring less force for the movement of the clay system in the annular space of the apparatus. The control sample of Marasperse N-22 (™LignoTech USA) is a refined lignosulfonate from softwood sulfite waste pulping liquors and considered to be a superior dispersant.

1. ASP-200 Stellar Clay

Sulfoalkylated alkaline lignin raw material and polymerized (5% and 10% sodium persulfate) sulfoalkylated kraft alkali lignin samples were evaluated as dispersants for stellar clay. Results are shown in Table 3 and indicate that the smallest molecular size (sulfomethylated alkaline lignin raw material) to be the most efficient dispersant for stellar clay, somewhat better than Marasperse N-22. Due to the fine particle size and high particle density of stellar clay (Kaolin clay), it is logical that a small size dispersant would be more efficient in covering all of the clay particles being dispersed. However, polymerized sulfomethylated material 284-39B was equivalent to the superior clay dispersant Marasperse N-22.

TABLE 3

DISPERSION OF ASP-200 STELLAR CLAY

| | | Reaction Conditions | | | Product | | | | |
|---|---|---|---|---|---|---|---|---|---|
| | | Polymerization | Sulfomethylation | | HPLC | Test Results* | | | Yield Point |
| Notebook Reference | Product Description | % $Na_2S_2O_8$ | % HCHO | % $NaHSO_3$ Eq | MOL Size | Fann Viscometer 600° | 300° | 3° | Lbs/100 Sq. Ft. |
| | Marasperse N-22 Control | — | — | — | 35,000 | 182 | 158 | 60 | 134 |
| 284-40B | Sulfomethylated Curan 27-11 | 0 | 8 | 20 | 40,747 | 134 | 113 | 80 | 92 |
| 284-39B | Polymerized Sulf. Curan 27-11 | 5 | 8 | 20 | 93,324 | 191 | 164 | 114 | 137 |
| 284-41B | Polymerized Sulf. Curan 27-11 | 10 | 8 | 20 | 201,579 | TOO THICK TO TEST | | | |

In addition, a second dispersion evaluation was made evaluating as a dye dispersant as described below. 2. Sodyecron Orange SLS Disperse Brown 1 Dye The sulfomethylated alkaline lignin and two polymerized (5% and 10% sodium persulfate) sulfomethylated alkali lignin samples were evaluated as dispersants for dye against Product A on Sodyecron Orange SLS Disperse Brown 1. The evaluation method was as follows:

Standard Method—LignoTech USA

Experimental Kraft Lignin Dispersants

Formulation for Sodyecron Orange SLS Disperse Brown 1 100% Granules

```
 5.0% Water
43.9% Presscake
 0.3% Defoamer
32.1% Kraft lignin type dispersant (primary)
18.7% Lignosol SFX-65 (secondary, added after particle size reduction)
100.0%
```

Sample milled with 2 mm glass beads until it passes AATCC 2/4 dispersion test. Spray dry the paste at 170° C. inlet. Determine AATCC 2/4 dispersion stability on the powder and perform tar test to determine if product agglomerates.

Data in the following table illustrate the dispersive power and temperature stability of the sulfomethylated alone lignin and the two sulfomethylated polymerized alkali lignin products of the invention in comparison to Reax 85A, a sodium lignosulfonate available from the Wesvaco Company which is obtained by sulfonating the lignin obtained by acid precipitation from a kraft wood pulping spent liquor.

TABLE 4

Dye Dispersion Evaluation
Sodyecron Orange SLS Disperse Brown 1

| | | Test Conditions | | Test Results | |
|---|---|---|---|---|---|
| | Molecular | Milling | | 170° Dryer | |
| Dispersant | Size | Time | pH | 2/4 | Tar |
| Reax 85A (0307-22A) | 60,000 | 6 hours | 8.8 | 12 secs. OK | pass |
| 284-40B | 40,747 | 6 hours | 8.7 | 12 secs. | pass |

TABLE 4-continued

Dye Dispersion Evaluation
Sodyecron Orange SLS Disperse Brown 1

| | | Test Conditions | | Test Results | |
|---|---|---|---|---|---|
| | Molecular | Milling | | 170° Dryer | |
| Dispersant | Size | Time | pH | 2/4 | Tar |
| (307-22B) | | | | OK | |
| 284-39B | 93,324 | 6 hours | 8.3 | 14 secs. | pass |
| (307-22D) | | | | OK | |
| 284-41B | 201,579 | 6 hours | 8.1 | 12 secs. | pass |
| (307-22D) | | | | OK | |

The polymerized products are in all respects equivalent to Reax 85A, a dye dispersant known in the industry.

EXAMPLE 3

Polymerized Activated Alkali Lignin—Polymeric Drilling Fluids

A series of polymerized alkaline lignin samples using sodium persulfate free radical initiator were made and evaluated as a polymeric gel system for a low solids drilling fluid (no montmorillonite clay). Data in the following table illustrate the superior rheology, including thixotropy gelation character, of high molecular weight polymerized activated alkali lignin materials of the present invention. With sodium persulfate polymerization reaction alone the general rheology and especially gel strength development was unimpressive with reaction concentrations of 5% and 10% solids, 20%, 30%, 40% and 60% sodium persulfate and with acid and base conditions. The basic condition polymerized product 284-45 is shown in Table 5.

TABLE 5

Polymeric Drilling Fluids

| | Sample | | | | | | Product | | | | | | | |
|---|---|---|---|---|---|---|---|---|---|---|---|---|---|---|
| | | | | | | | | | | | Rheology (Baroid Viscometer) | | | |
| Note-book No. | Raw Material | Reaction Condition | | | % Total Solids | % Organic Solids | Adj. pH | 600° | 300° | 0' Gel | 10' Gel | Plastic Visc. cps. | Apparent Visc. cps | Yield lbs./100 sq. ft. | Molecular Weight |
| | | Solids % | pH | % Na$_2$S$_2$O$_3$ | | | | | | | | | | | |
| 284-40A | kraft 27-11 R.M. | — | — | — | –>10.0 | –>10.0 | 9.7 | 11 | 6 | 0 | 0 | 5 | 1 | 6 | 26,092 |
| 284-45 | kraft 27-11 | 10 | 6% NaOH | 40 | 10.0 | 6.7 | 8.9 | 26 | 15 | 0 | 0 | 11 | 13 | 4 | 219,200 |
| 284-45A | 284-45 | 10 | 5% NaOH, 10% Ozone Ox. | — | 9.8 | 6.8 | 7.5 | 40 | 25 | 1 | 6 | 15 | 20 | 10 | 296,600 |
| 284-40C | kraft 27-11 | 15 | 5% NaOH, 10% Ozone Ox. | — | –>10.0 | –>10.0 | 8.3 | 2 | 1 | 0 | 0 | 1 | 1 | 0 | 99,300 |
| 284-48 | 284-40C | 10 | 8.3 | 40 | 11.5 | 7.6 | 9.5 10.5 | 83 44 | 62 28 | 17 1 | 70 2 | 21 16 | 42 22 | 41 12 | 970,000 |
| 284-60 | 284-40C | 10 | 9.3 | 60 | 9.6 | 6.4 | 8.9 | 75 | 53 | 18 | 46 | 22 | 31 | 38 | >1,000,000 |

A sodium persulfate polymerized sample of alkaline lignin was oxidized with ozone a known free radical initiator also. The resulting product, 284-45A, gave a modest gel strength increase and encouraged follow-up of this technology.

Oxidation of alkali lignin with ozone followed by sodium persulfate 40% free radical polymerization (284-48) gave excellent rheology at pH 9.5 with gel strengths (0 min.=17 lbs., 10 min.=70 lbs.) values similar to bentonite montmorillonite clay systems of much higher insoluble solids content. pH increased to 10.5 gave continued interesting rheology and good gel strength. Ozone oxidation alone (284-40C) of alkali lignin gave unimpressive rheology.

Molecular weight increase of alkali lignin treated with 10% ozone is minimal at 99,300. Ozone after sodium persulfate, however, increases the molecular weight to 300,000.

Ozone oxidation before persulfate (284-48) increases molecular weight dramatically to 970,000 minimum. Product 284-48 is the first indication that lignin alone may be modified to give a thickening polymer system at low concentrations of organic solids.

Kraft lignin activated with 10% ozone oxidation and polymerized with 60% sodium persulfate charge (284-60) gave a material of exceptionally high molecular weight and comparatively high rheology as shown in Table 5. Results shown for sample 284-60 are at a diluted concentration of 9.6% total solids (6% organic solids) necessary to process and evaluate this material. Even at this significantly lower concentration the yield point and gel strengths were still higher than 40% persulfate polymerized material, 284-48. The molecular weight of the 284-60 material at >1,000,000 was too high to measure using LignoTech USA present analytical high pressure liquid chromatography columns.

Rheology Test Method

All flow properties described as rheology values were measured with a Baroid Model 28600 Variable Speed Electronic Rheometer (rotational viscometer) recording degree speed readings (600, 800, 700, 100, 3) with calculated zero and 10 minute gelation strengths (lbs./100 sq. ft.), apparent viscosity (cps) and yield points (lbs./100 sq. ft.).

Other oxidizing agents used for activation such as hydrogen peroxide are not as effective for activation of alkali lignin before persulfate free radical polymerization as shown in Table 6 below:

TABLE 6

| | Reaction Conditions | | |
|---|---|---|---|
| Sample Research No. | Oxidizing Agent | Na$_2$S$_2$O$_8$ | Molecular Weight HPLC |
| 284-48 | O$_3$ | 10% | 40% | 970,000 |
| 284-55 | H$_2$O$_2$ | 10% | 0 | 29,300 |
| 284-55A | H$_2$O$_2$ | 10% | 40% | 314,000 |
| 284-45 | None | | 40% | 219,200 |
| 284-40C | O$_3$ | 10% | 0 | 99,300 |

Hydrogen peroxide oxidation with 40% Na$_2$S$_2$O$_8$ Polymerization (284-55A) gives molecular weight only slightly increased over that of persulfate polymerization alone (284-45).

EXAMPLE 4

Reconstitution—Low Solids Drilling Polymer

It is an important property of the products of the invention that they can be dried by normal commercial methods (e.g. spray drying) and reconstituted to give desirable rheological thixotropic gelation character required in applications such as low solids drilling systems. The following Table 7 shows that when dried at pH 11.5 (284-53), products of this invention after reconstitution have rheology equivalent and give better gel strengths than original materials. If dried at lower pH (≈10.0), after reconstitution the rheology and gel strengths are inferior.

TABLE 7

Spray Dried - Reconstitution

| Notebook Reference | Product Description | Spray Dried | Spray Dried pH | Product pH | Solids, % | Rheology 600 | 300 | 0 Gel | 10' Gel | YP |
|---|---|---|---|---|---|---|---|---|---|---|
| 284-52-1 | Kraft-O$_8$ 10% Na$_2$S$_2$O$_8$ | No | | 9.8 | 11 | 65 | 46 | 4 | 21 | 27 |
| 284-52-2 | Reconstituted | Yes | 10.0 | 9.2 | 11 | 13 | 6 | 0 | 0 | −1 |
| 284-53-1 | Kraft O$_3$ 10% Na$_2$S$_2$O$_8$ 40% | No | | 11.5 | 12 | 37 | 22 | 1 | 6 | 7 |
| 284-53-2 | Reconstituted | Yes | 11.5 | 10.0 | 10.8 | 22 | 13 | 0 | 0 | 4 |
| 284-53-3 | Reconstituted | Yes | 11.5 | 9.0 | 10.8 | 53 | 37 | 6 | 34 | 21 |
| 284-53-4 | Reconstituted 14 day storage | Yes | 11.5 | 9.0 | 10.8 | 100 | 79 | 35 | 61 | 58 |
| 284-53-5 | Reconstituted 14 day storage | Yes | 11.5 | 9.0 | 8.6 | 36 | 23 | 3 | 15 | 10 |

EXAMPLE 5

Effective Sodium Chloride Contamination—Low Solids Drilling Polymer

Data in the following table illustrate the effective salt tolerance of high molecular weight polymerized activated alkali lignin materials of the present invention. Polymer 284-52-1 at pH 8.0 (284-52-3) was treated with 2.5% sodium chloride (284-52-4). Rheology including gel strength increased as the pH decreased to 7.4. Adjustment of pH to original 8.0 gave rheology and gel strengths equal to the original indicating that high molecular weight materials of this invention do have the required property of salt tolerance necessary for low solids drilling fluids.

TABLE 8

Effect of NaCL Contamination

| Notebook Reference | Product Description | Spray Dried | Spray Dried pH | Product pH | Solids, % | Rheology 600 | 300 | 0 Gel | 10' Gel | YP |
|---|---|---|---|---|---|---|---|---|---|---|
| 284-52-3 | 284-52-1 Reconstituted | Yes | 10.0 | 8.0 | 11.0 | 16 | 8 | 0 | 0 | 0 |
| 284-52-4 | +2.5% NaCl | Yes | 10.0 | 7.4 | 11.0 | 45 | 29 | 2 | 6 | 13 |
| 284-52-5 | +2.5% NaCl + NaOH | Yes | 10.0 | 8.0 | 11.0 | 18 | 9 | 0 | 0 | 0 |

EXAMPLE 6

Storage Stability

Kraft lignin activated by oxidation with 10% ozone was polymerized with 60% sodium persulfate (284-60) and stored at room temperature for 30 days. Rheology was run at periodic intervals to evaluate stability at room temperature. Thixotropic properties evaluated as gel strength in lbs./100 ft.$^2$ are shown in the following Table 9.

TABLE 9

Gel Strength vs. Time - Sample 284-60

| Time, Days | 1 | 5 | 9 | 12 | 20 | 30 |
|---|---|---|---|---|---|---|
| Gel Strength, lbs./100 sq. ft. (42° C.) | 22 | 40 | 40 | 47 | 52 | 58 |

As shown after initial Theological gelation increase, thixotropic properties changed very little over a 30-day period.

I claim:

1. A method for preparing a polymerized alkali lignin material which comprises:

reacting under anaerobic conditions an alkaline solution of alkali lignin obtained from an alkaline pulping process at a temperature between about 20° C. to 90° C. with between 5% to 80% by weight based on said alkali lignin of sodium persulfate at a pH of between about 7 to 12 for a sufficient time to form a polymerized alkali lignin having a molecular weight greater than that of said alkali lignin.

2. The method of claim 1 further including the step of separating said polymerized alkali lignin from said solution by spray drying the solution at a pH of 11 or above.

3. The method of claim 1 wherein said alkaline solution comprises lignin-containing spent liquor obtained from an alkaline pulping process.

4. The method of claim 3 wherein said alkaline pulping process comprises alkaline pulping of softwood wood chips.

5. The method of claim 1 further including the step of preparing said alkaline solution by dissolving alkali lignin in an alkaline aqueous medium.

6. The method of claim 5 further including the step of isolating said alkali lignin from spent liquor obtained from alkaline pulping of wood prior to dissolving said alkali lignin in said alkaline aqueous medium.

7. The method of claim 6 wherein the step of isolating said alkali lignin comprises acidifying said spent liquor to precipitate alkali lignin, separating the precipitated alkali lignin from said acidified spent liquor, and washing said precipitated alkali lignin.

8. The method of claim 1 further including the step of sulfoalkylating said polymerized alkali lignin.

9. The method of claim 8 wherein sulfoalkylating comprises sulfomethylating said polymerized alkali lignin.

10. The method of claim 8 wherein sulfoalkylating occurs prior to separating from said alkaline solution.

11. The method of claim 8 wherein sulfoalkylating occurs subsequent to separating said polymerized alkali lignin from said alkaline solution.

12. The method of claim 1 further including the step of oxidizing said polymerized alkali lignin.

13. The method of claim 12 wherein oxidizing comprises reacting said polymerized alkali lignin with an oxidizing agent selected from the group consisting of air, ozone, hydrogen peroxide and combinations thereof.

14. The method of claim 12 wherein oxidizing occurs prior to separating from said alkaline solution.

15. The method of claim 12 wherein oxidizing occurs subsequent to separating said polymerized alkali lignin from said alkaline solution.

16. A method for preparing a polymerized modified alkali lignin material which comprises:

oxidizing an alkaline solution of alkali lignin obtained from an alkaline pulping process at a temperature between 0° C. to 70° C. for a period of time sufficient to activate said alkali lignin;

reacting under anaerobic conditions said alkaline solution of oxidized alkali lignin at a temperature between about 20° C. to 90° C. with between 5% to 80% by weight based on said oxidized alkali lignin of sodium persulfate at a pH of between about 4 to 12 for a sufficient time to form a polymerized oxidized alkali lignin having a molecular weight greater than that of said oxidized alkali lignin.

17. The method of claim 16 further including the step of separating said polymerized alkali lignin from said solution by spray drying the solution at a pH of 11 or above.

18. The method of claim 16 wherein said alkaline solution comprises lignin-containing spent liquor obtained from an alkaline pulping process.

19. The method of claim 18 wherein said alkaline pulping process comprises alkaline pulping of softwood wood chips.

20. The method of claim 16 further including the step of preparing said alkaline solution by dissolving alkali lignin in an alkaline aqueous medium.

21. The method of claim 20 further including the step of isolating said alkali lignin from spent liquor obtained from alkaline pulping of wood prior to dissolving said alkali lignin in said alkaline aqueous medium.

22. The method of claim 21 wherein the step of isolating said alkali lignin comprises acidifying said spent liquor to precipitate alkali lignin, separating the precipitated alkali lignin from said acidified spent liquor, and washing said precipitated alkali lignin.

23. The method of claim 16 further including the step of sulfoalkylating said polymerized oxidized alkali lignin.

24. The method of claim 23 wherein sulfoalkylating comprises sulfomethylating said polymerized oxidized alkali lignin.

25. The method of claim 23 wherein sulfoalkylating occurs prior to separating said polymerized oxidized alkali lignin from said alkaline solution.

26. The method of claim 23 wherein sulfoalkylating occurs subsequent to separating said polymerized oxidized alkali lignin from said alkaline solution.

27. The method of claim 16 wherein oxidizing comprises reacting said alkali lignin with an oxidizing agent selected from the group consisting of air, ozone, hydrogen peroxide and combinations thereof.

28. The method of claim 16 wherein oxidizing comprises reacting said alkali lignin with ozone for a period of time sufficient to absorb in said alkaline solution between about 2% to 15% ozone by weight based on the weight of alkali lignin in said alkaline solution while maintaining a pH above about 8.

29. The method of claim 28 wherein said alkali lignin is oxidized with about 5% to 10% ozone and the oxidized alkali lignin is reacted with about 35% to 65% sodium persulfate based on the weight of oxidized alkali lignin in said alkaline solution.

* * * * *